Figure 1:
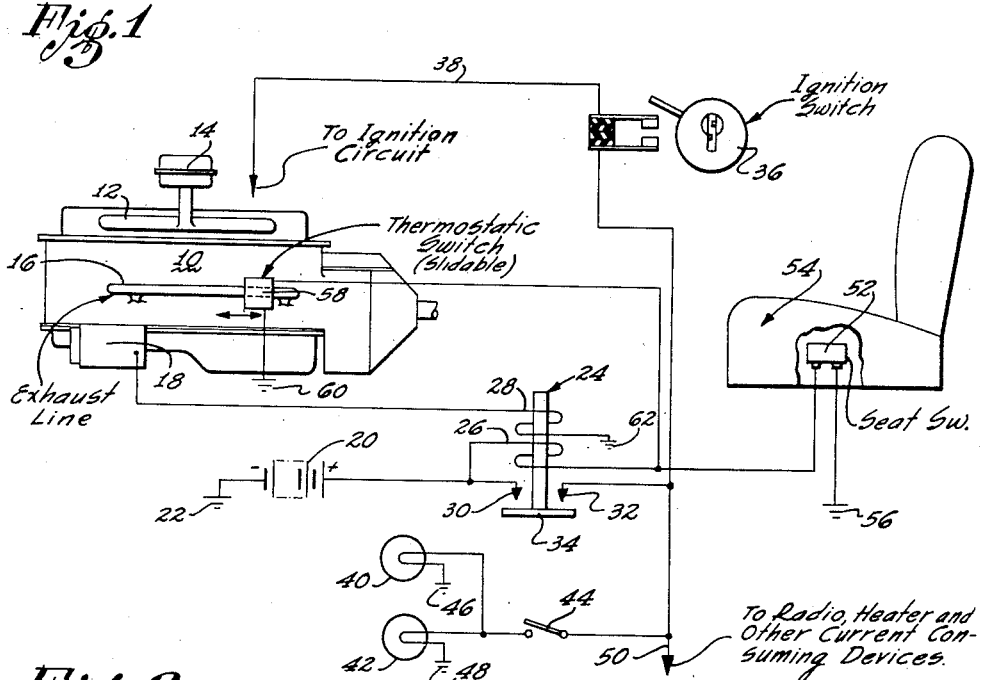

Sept 10, 1957 W. POZNIK 2,806,150
AUTOMOTIVE CONTROL SYSTEM
Filed June 28, 1956 2 Sheets-Sheet 1

INVENTOR:
William Poznik,
By Smyth Roston
Attorneys

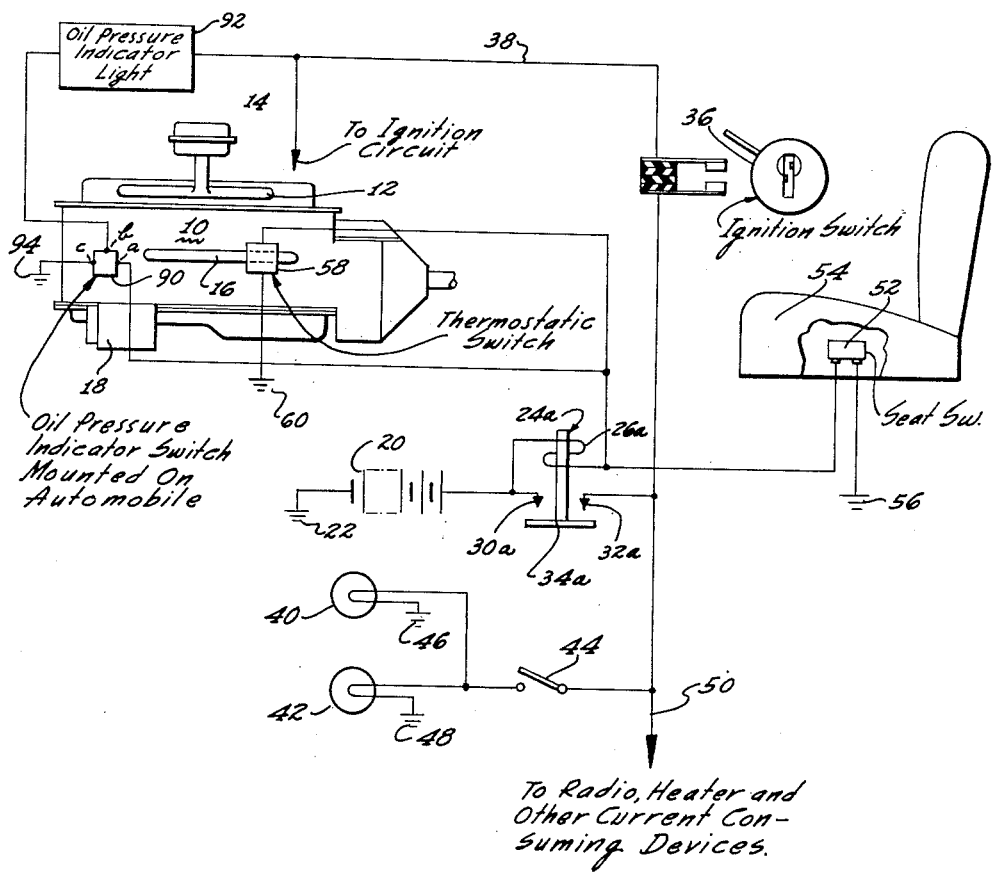

United States Patent Office 2,806,150
Patented Sept. 10, 1957

2,806,150

AUTOMOTIVE CONTROL SYSTEM

William Poznik, Redondo Beach, Calif.

Application June 28, 1956, Serial No. 594,493

9 Claims. (Cl. 307—10)

The present invention relates to electrical control systems for automotive vehicles and the like, and the invention is more particularly concerned with electrical control circuits and systems for automatically disconnecting all electric loads from the source of electrical energy of the vehicle when the vehicle is not in use.

The present application is a continuation-in-part of copending application 359,174, filed June 2, 1953, now Patent No. 2,758,216.

In most automobiles and other automotive vehicles in present day use, many of the auxiliary current consuming devices are connected to the battery through independent circuits. Therefore, it is possible for the operator to leave the vehicle with, for example, the headlights, radio, and even the ignition system, in an energized condition. This can produce a severe drain on the battery of the vehicle, and it is a common experience for a person to return to his automobile after such an occurrence and find the battery dead, or in a seriously low state of charge.

Control systems have been proposed in the past for automatically disconnecting the current consuming devices of an automobile from the battery. However, in some instances, these prior art systems have proven themselves to be somewhat complicated in their construction and somewhat awkward to install in the electrical system of existing cars. In other instances, it has been found that prior art control systems of this type often operate at times when their operation is not desired.

For example, one known prior art control system automatically disconnects the current consuming devices whenever the driver leaves the driver's seat of the automobile. However, this can prove awkward in situations where the driver merely wishes to step out of the car for a moment to close his garage doors or to check some item. At such times, he does not want his headlights, and other instrumentalities in the car to be turned off.

Another prior art control system automatically disconnects the current control system of the vehicle whenever the engine temperature drops below a predetermined threshold. This is a convenient system in that it provides an appreciable time lag before it operates, so that the operator can leave the vehicle for short intervals without the electrical accessories being deenergized. However, in this latter type of prior art control system, the ignition system of the automobile must be made independent of the control system and not actuated thereby. This is because the engine is cold when it is first started, and this would normally cause the control system to operate to deenergize the current consuming devices. Therefore, in this latter prior art system, it is necessary to have the ignition switch by-pass the control system, otherwise the control system would prevent the ignition system from being energized. Thus, it is not possible to bring the ignition system under the control of this prior art control system.

The control system of the present invention is so conceived, and its various components are so related and they cooperate with one another in such a manner, that the control system operates only when it is wanted. Moreover, the improved control system of the invention enables full control of all the current consuming devices in the vehicle to be obtained, including a control of the ignition system.

For example, the control system of the invention disconnects the current consuming devices of the vehicle whenever the engine temperature drops below a selected threshold. Therefore, if one parks his car and leaves it with the engine off, the control system will automatically disconnect all the current consuming devices (including the ignition) that might have inadvertently been left on. However, this automatic disconnection does not occur until after a time interval, of, for example, 25 to 30 minutes, and this allows the operator to leave his car for such intervals without having the control system function. In addition to this, and no matter how cold the engine might happen to be, the control system will not perform its disconnecting function so long as the driver is in the car. Also, even if the driver is absent and the engine is still cold, if the engine is left running, the control system will not operate to turn off the electrical equipment.

In short, the control system of the invention operates to disconnect all the current consuming devices from the battery only after the operator has left the car and the motor is not running, and even then, only after a predetermined time has elapsed. That is, the control system of the invention operates only when it is needed and it does not become a nuisance by undesired operation at any other time.

A feature of the control system of the invention is that it entails relatively few parts so as to be inexpensive. Moreover, the control system may be simply installed in an automobile, and without disturbing the existing electrical system of the vehicle to any appreciable extent.

Figure 2:
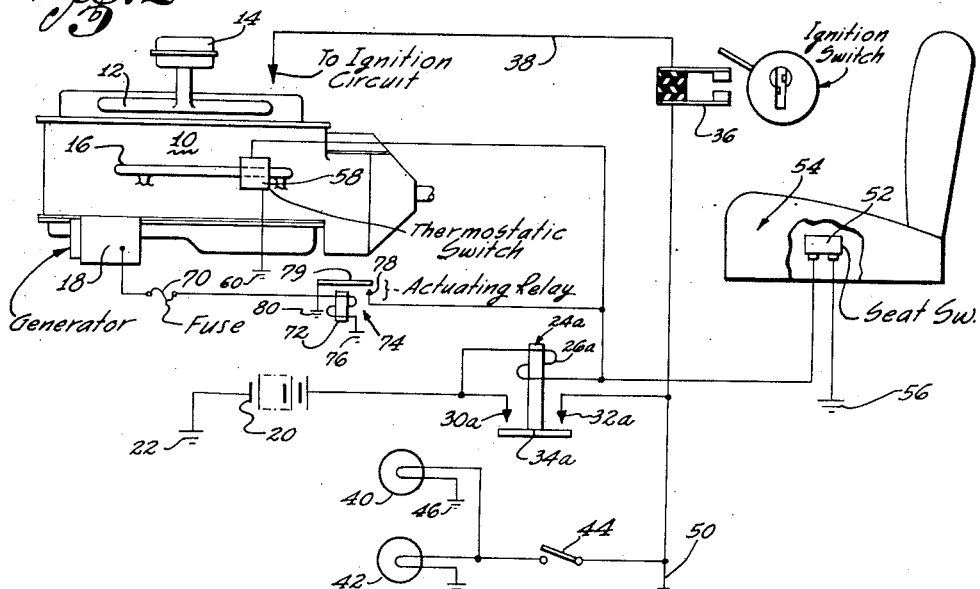

Other features and advantages of the present invention will be hereinafter apparent from the following description, particularly when taken in connection with the accompanying drawings, in which:

Figure 1 shows one embodiment of the improved control system of the invention in which thermostatic switch means responding to engine temperature, a pressure-operated switch responding to the presence of the operator, and additional means responding to the voltage from the generator of the engine, combine and cooperate to effectuate the desired control of the present invention;

Figure 2 shows a second embodiment of the invention and is somewhat similar to that of Figure 1 but which uses an actuating relay in the circuit to the engine generator, this relay having the feature of responding to the generated voltage from the generator even though that voltage may vary throughout a large range; and Figure 3 shows a third embodiment of the invention in which use is made of a pressure switch situated, for example, in an oil line of the engine to provide the desired control when the engine is running and when the oil pressure reaches a predetermined value.

Throughout the drawings, like reference numerals are used to designate similar parts.

With reference now in particular to Figure 1, an internal combustion engine such as is used in most automotive vehicles is indicated generally as 10. The engine 10 is provided with a usual intake manifold 12 which, in turn, is connected to a suitable carburetor 14. The engine is also equipped with an exhaust manifold 16 and with a generator 18. It is to be understood that the illustration of the engine is schematic and is intended merely to represent the internal combustion engine of a typical automotive vehicle and various well known components associated with the engine.

The vehicle also includes a source of electrical energy 20 in the form of a usual storage battery. One terminal of the storage battery is connected to the frame of the vehicle which constitutes the common connection of the electrical system and which, for convenience, shall be designated as a ground connection 22.

The embodiment of the invention shown in Figure 1 includes a solenoid switch 24 of usual and known construction, and this switch includes a first actuating winding 26 and a second actuating winding 28. The solenoid switch also includes a pair of normally open contacts 30, 32, and these contacts are closed by an arm 34 whenever either the solenoid winding 26 of the solenoid winding 28, or both, are energized.

These normally-open solenoid contacts 30, 32 are connected in circuit between the ungrounded terminal of the source 20 and one terminal of a usual key-operated ignition switch 36. The other terminal of the ignition switch 36 is connected to the conventional ignition circuit of the vehicle (not shown), and this connection is made over a lead 38.

The normally open contacts 30, 32 of the solenoid switch 24 are also connected in circuit with the ungrounded terminal of the source 20 and one terminal of a pair of electric lamps such as the headlights 40, 42, a manually-operated control switch 44 being interposed in the connection to the headlights. The other terminals of the headlights 40, 42 are connected respectively to the frame of the vehicle as indicated by the ground connections 46 and 48. The contacts 30, 32 of the solenoid switch 24 are also connected between the ungrounded terminal of the source 20 and a lead 50. The lead 50 is connected to other current consuming devices of the vehicle such as the radio, heater, and other accessories; the return connection of these accessories to the source 20 being made through the grounded frame of the vehicle.

It is apparent from the preceding description that, as long as the solenoid contacts 30 and 32 are closed, a circuit is established to the manually operated headlight switch 44 so that the headlights 40 and 42 can be turned on and off for normal operation. Moreover, an energizing circuit over lead 50 to the additional current consuming devices is established so long as these solenoid contacts are closed, as is a connection from the source 20 to the ignition switch 36 so that the ignition system of the vehicle can be energized. In other words, as long as the solenoid switch 24 is energized and the contacts 30 and 32 are closed, the electrical system of the vehicle may be operated in a normal manner.

The vehicle also includes a pressure-operated switch 52 which is mounted under the driver's seat 54 of the vehicle. The switch 52 is adapted to close its electric contacts in the presence of the driver or operator in the driver's seat. That is, the weight of an operator in the driver's seat deflects the seat springs and thereby actuates the switch which causes it to close its electric contacts. One terminal of the switch 52 is connected to the frame of the vehicle or ground as at 56, and the other terminal of this switch is connected through the energizing winding 26 of the solenoid switch 24 to the ungrounded terminal of the source 20.

Further in accordance with the invention, a thermostatic switch 58 of known construction is mounted with its control element in the immediate vicinity of the internal combustion engine 10. An appropriate mounting position of the switch 58 is on the exhaust line 16 of the engine. The switch may conveniently be slidably mounted on the exhaust line so that the heat threshold of the engine itself at which the switch contacts will close can be readily adjustable merely by sliding the switch along the line between its hot end and its cool end. The thermostatic switch 58 is connected in shunt with the pressure operated switch 52. That is, one terminal of the switch 58 is connected to the frame of the vehicle or ground as at 60, and the other terminal is connected through the winding 26 to the ungrounded terminal of the source 20.

The generator 18 associated with the engine 10 has its ungrounded terminal connected through the energizing winding 28 of the solenoid switch 24 to the frame of the vehicle or ground as at 62. Whenever the engine 10 is running, the generator 18 generates a voltage, and this voltage produces an energizing current in the solenoid winding 28 and close the contacts 30 and 32. The relay is sensitive enough to operate even at the low voltage at idling speed.

Whenever the operator is in the driver's seat 54, the switch 52 is closed and the winding 26 of the solenoid switch 24 is energized. This causes the arm 34 to close the solenoid contacts 30 and 32, and the electrical system of the vehicle may be operated in normal manner. Now, should the operator turn the ignition switch and start the engine 10, the generator 18 will develop a voltage, this voltage for the reasons described above, energizes the winding 28 of the solenoid switch 24 so as to maintain the solenoid contacts 30 and 32 closed, even though the solenoid winding 26 may become deenergized. This means that the operator is now free to leave the car so long as the engine is running, without the control system of the invention being effective to function and turn off the various current consuming devices of the vehicle. After a certain running time, the engine 10 warms up and the heat developed by it exceeds the selected threshold to close the thermostatic switch 58. The closure of of this switch causes the solenoid winding 26 to be energized and the solenoid contacts 30 and 32 to be closed, regardless of whether the engine is running or whether the operator is in the operator's seat. Therefore, the operator is now free to turn off the engine and leave the vehicle, and still the control system of the engine will not function to disconnect the accessories until a predetermined time interval has elapsed. This time interval may be of the order of 10 to 30 minutes with usual present day thermostatic switches depending on adjustment. However, should the operator leave the car and inadvertently leave several or all of the current consuming devices energized, including the ignition circuit; then, after a predetermined interval has elapsed the control system of the invention will function to disconnect these devices automatically and prevent damage to the battery source 20.

It is evident from the diagram of Figure 1, that the control system of the invention may be easily and conveniently installed in present-day motor vehicles. The existing electrical system of such a vehicle need not be changed to any appreciable extent, it being merely necessary to incorporate the solenoid contacts 30 and 32 into the ungrounded lead from the battery or source 20. Moreover, the entire control system may be composed of the solenoid switch 24, the thermostatic switch 58, the pressure-operated switch 50 and their associated simple connections. Therefore, the system is inexpensive and simple in its construction.

The system of Figure 2 is similar to that of Figure 1 with the exception that the double winding solenoid switch 24 of Figure 1 is replaced by a single winding solenoid switch 24a. The switch 24a may be similar to switch 24 in all other respects, and it contains a pair of normally open contacts 30a and 32a which are closed by an arm 34a when its energizing winding 26a is energized. The solenoid winding 26a, as was the case of the solenoid winding 26 in Figure 1, is energized by the pressure operated switch 54 and by the thermostatic switch 58.

In the embodiment of Figure 2, the generator 18 is connected through a fuse 70 and through the energizing winding 72 of an actuating relay 74 to the frame of the vehicle or ground as at 76. The actuating relay 74 has a contact 78 connected to the junction of switches 58 and 52 with the winding 26a, and the relay has an arm 79 which is connected to the frame or ground as at 80. It can be seen that the relay 74 is connected to the winding 26a in shunt with the switches 58 and 52. Therefore, the winding 26a is energized whenever the actuating relay 74 is energized. The actuating relay is designed to operate through a wide range of voltages. That is, even though the voltage regulator of the vehicle has cut out the generator 18, so that the generator is operating on residual magnetism and even at idling speed, the extremely low voltage then generated is sufficient to energize the winding 72 of the actuating relay. Also, even when the generator 18 produces its full voltage output, the relay 74 is designed to withstand the resulting increase current flow through it.

It can be seen that the system of Figure 2 provides the same control as that of Figure 1. In the system of Figure 2, whenever the engine is running and the generator 18 develops a voltage, the actuating relay 74 is energized to close its arm 79 on its contact 78. Therefore, as in the preceding embodiment, the solenoid switch 24a is energized to permit normal operation of the electrical system of the vehicle so long as the engine is running. This condition obtains regardless of the condition of the switches 52 or 58, that is, even though the engine is cold and even though the operator leaves the vehicle.

The embodiment of Figure 3 is similar to the embodiment of Figure 2; except that it depends upon the operation of a pressure-operated switch in an oil line, rather than on the generator 18, to indicate whether or not the engine is running.

It is usual for most present day automobiles to include an oil pressure indicator lamp. This lamp is operated by a pressure switch in one of the oil lines and is energized whenever the oil pressure drops below a selected level. In the embodiment of Figure 3, this oil pressure switch may be replaced by a single-pole-double-throw switch 90 mounted on one of the conduits of the engine 10 through which oil is pumped under pressure when the engine is running. This switch is constructed to open the circuit to the oil pressure indicator light 92 when the oil pressure in that conduit exceeds a predetermined threshold, and the switch is constructed to close a second circuit when it opens the circuit to the indicator. The switch 90 is connected in shunt with the switches 52 and 58. That is, the switch 90 has a common terminal "c" connected to the frame of the vehicle or ground as at 94; it has a terminal "a" connected through the winding 26a of the solenoid switch 24a to the ungrounded terminal of the source 20; and it has a terminal "b" connected to one terminal of the oil pressure indicator light 92. The other terminal of this indicator light may be connected to the lead 38 extending from the ignition switch 36 to the ignition circuit.

The arrangement is such, that when the engine is running and the oil pressure has risen to the predetermined level, the switch 90 is actuated to open its contacts between the terminals "b" and "c," and thereby extinguish the light 92. At the same time the switch 90 closes its contacts between the terminals "a" and "c." The closure of the latter contacts causes the winding 26a to become energized even though one or both of the switches 52 and 58 may be open. This causes the control system to be rendered inoperative so long as the engine is running and the oil pressure is to the predetermined level. Therefore, even though the engine is cold or the operator should leave the vehicle, as long as the engine is running the control system is rendered ineffective to disconnect the electrical accessories.

Of course, it is not necessary for the pressure switch 90 of the control system of Figure 3 to be incorporated with the oil pressure indicator switch. It may be an independent pressure switch in a suitable one of the oil lines of the engine, or in any other portion of the engine exhibiting a pressure when the engine is running different from when the engine is stopped.

The invention provides, therefrom, an improved control system for automatically disconnecting the various electrical accessories of an automotive vehicle, when such accessories are inadvertently left in their energized condition. The present invention, in the manner described, is constructed so that it will function only under certain conditions which actually show that the accessories have, in fact, been inadvertently left energized, and the system will not operate during situations where operation is not wanted.

Although the now preferred embodiments of the present invention have been shown and described herein, it is to be understood that the invention is not to be limited thereto, for it is susceptible to changes in form and detail within the scope of the appended claims.

I claim:

1. An electrical control system for controlling the connection between a source of electrical energy and at least one current consuming device in an automotive vehicle and the like, such vehicle being driven by an engine adapted to develop heat when in its running state, said electrical control system including, thermostatic means adapted to be mounted in the vicinity of the engine to be controlled by the heat developed thereby to complete the circuit between the source and the current consuming device when the heat developed by the engine exceeds a selected threshold, means adapted to be operated by the presence of an operator in the vehicle for completing the circuit between the source and the current consuming device when the heat developed by the engine falls below the selected threshold, and electrical means for controlling the flow of an electric current in accordance with the operational state of the engine to complete the circuit between the source and the current consuming device when the engine is running but when the heat developed thereby is still below the selected threshold and when the operator is absent from the vehicle.

2. An electrical control system for controlling the connection between a source of electrical energy and at least one current consuming device in an automotive vehicle and the like, such vehicle being driven by an internal combustion engine adapted to develop heat when in its running state, said electrical control system including, switching means interposed between the source and the current consuming device, thermostatic means adapted to be mounted in the vicinity of the engine to be controlled by the heat developed thereby to actuate said switching means and complete the circuit between the source and the current consuming device when such heat exceeds a selected threshold, means adapted to be operated by the presence of an operator in the vehicle for actuating said switching means to complete the circuit between the source and the current consuming device when the heat developed by the engine falls below the selected threshold, and electrical means for controlling the flow of an electric current in accordance with the operational state of the engine to actuate said switching means and complete the circuit between the source and the current consuming device when the engine is running but when the heat developed thereby is still below the selected threshold and when the operator is absent from the vehicle.

3. An electrical control system for controlling the connection between a source of electrical energy and at least one current consuming device in an automotive vehicle and the like, such vehicle having an operator's seat and being driven by an engine adapted to develop heat when in its running state, said electrical control system including, switching means having normally open contacts, said contacts adapted to be in circuit between the source and the current consuming device and said switching means further having electrical winding means for closing said contacts upon the electrical energization of such winding means, thermostatic means adapted to be mounted in the vicinity of the engine to be controlled by the heat developed thereby, said thermostatic means being connected to said winding means to complete an energizing circuit to the same and maintain said contacts closed when the heat developed by the engine exceeds a selected threshold, a pressure-operated switch adapted to be operated by the presence of an operator in the operator's seat, said presure-operated switch being connected to said electrical winding means to complete an energizing circuit to the same and maintain said contacts closed in the presence of an operator in the operator's seat, and means for producing an electric current in said electrical winding means when the engine is running to energize said winding means and maintain said contacts closed.

4. An electrical control system for controlling the connection between a source of electrical energy and at least one current consuming device in an automotive vehicle and the like, such vehicle having an operator's seat and being driven by an internal combustion engine adapted to develop heat when in its running state, said electrical control system including, a solenoid switch having normally open contacts, said contacts being in circuit between the source and the current consuming device and said solenoid switch further having electrical winding means for closing the contacts upon the electrical energization of such winding means, thermostatic switch means adapted to be mounted in the immediate vicinity of the engine to be controlled by the heat developed thereby when the engine is in its running state, said thermostatic switch means being connected to said electrical winding means to complete an energizing circuit thereto and maintain said contacts closed when the heat developed by the engine exceeds a selected threshold, a pressure-operated switch adapted to be operated by the presence of an operator in the operator's seat of the vehicle, said pressure-operated switch being connected to said winding means to complete an energizing circuit to the same and maintain said contacts closed in the presence of an operator in the operator's seat, electrical means for producing a voltage when the engine is in its running state, and means for introducing the voltage from said electrical means across said winding means to energize the same and maintain said contacts closed when the engine is running.

5. The electrical control system of claim 4 in which said thermostatic means is adjustably positioned with respect to the engine to control the heat threshold at which said thermostatic means completes the energizing circuit to said winding means of said solenoid switch.

6. An electrical control system for controlling the connection between an electric battery and a plurality of current consuming devices in an automobile, such automobile including a driver's seat and being driven by an internal combustion engine having an exhaust line and ignition system associated therewith, said electrical control system including, a solenoid switch having normally open contacts, said contacts being in circuit between the source and the current consuming devices and between the source and the ignition system, said solenoid switch further having electrical winding means for closing the contacts upon the electrical energization of such winding means, thermostatic switch means mounted on the exhaust line of the engine to be controlled by the heat developed thereby when the engine is in its running state, said thermostatic switch means being connected to said winding means to complete an energizing circuit thereto from the source and maintain said contacts closed when the heat developed by the engine exceeds a selected threshold, a pressure-operated switch mounted under the driver's seat and adapted to be closed by the presence of an operator in the driver's seat, said pressure-operated switch being connected to said electrical winding means to complete an energizing circuit to the same and maintain said contacts closed in the presence of an operator in the driver's seat, and means for producing an electric current in said winding means when the engine is running to energize said winding means and maintain said contacts closed.

7. An electrical control system for controlling the connection between a source of electrical energy and at least one current consuming device in an automotive vehicle and the like, such vehicle having an operator's seat and being driven by an engine adapted to develop heat when in its running state, the engine having an electric generator asociated therewith for developing a voltage whenever the engine is running, said electrical control system including, a solenoid switch having normally open contacts, said contacts being in circuit between the source and the current consuming device and said solenoid switch further having first and second electrical windings for closing the contacts upon the electrical energization of such windings, a thermostatic switch adapted to be mounted in the immediate vicinity of the engine to be controlled by the heat developed thereby when the engine is in its running state, said thermostatic switch being connected to the first of said windings to complete an energizing circuit thereto from the source and maintain said contacts closed when the heat developed by the engine exceeds a selected threshold, a pressure-operated switch adapted to be mounted under the operator's seat to be operated by the pressure of an operator in that seat, said pressure-operated switch being connected to said first winding in shunt with said thermostatic switch to complete an energizing circuit thereto from the source and maintain said contacts closed in the presence of an operator in the operator's seat, and means for connecting the generator to the second of said windings to energize the same and maintain said contacts closed when the engine is running.

8. An electrical control system for controlling the connection between a source of electrical energy and at least one current consuming device in an automotive vehicle and the like, such vehicle having an operator's seat and being driven by an engine adapted to develop heat when in its running state, the engine having an electric generator associated therewith for developing a voltage whenever the engine is running, said electrical control system including, a solenoid switch having normally open contacts, said contacts being in circuit between the source and the current consuming device and said solenoid switch further having an electrical winding for closing the contacts upon the electrical energization thereof, a thermostatic switch adapted to be mounted in the immediate vicinity of the engine to be controlled by the heat developed thereby when the engine is in its running state, said thermostatic switch being connected to said electrical winding to complete an energizing circuit thereto from the source and maintain said contacts closed when the heat developed by the engine exceeds a selected threshold, a pressure-operated switch adapted to be mounted under the operator's seat to be operated by the presence of an operator in that seat, said pressure-operated switch being connected to said winding in shunt with said thermostatic switch to complete an energizing circuit thereto from the source and maintain said contacts closed in the presence of an operator in the operator's seat, an actuating relay having a pair of normally open contacts, said contacts of said relay being in circuit between the source of said winding of said solenoid switch, and said actuating relay having a winding connected to the generator, said relay winding being energized when the engine is running to close the contacts of said relay and energize said winding of said solenoid switch and thereby to maintain said contacts of said solenoid switch closed when the engine is running.

9. An electrical control system for controlling the connection between a source of electrical energy and at least one current consuming device in an automotive vehicle and the like, such vehicle having an operator's seat and being driven by an engine adapted to develop heat when in its running state, the engine having an electrical switch adapted to be closed whenever the engine is running and when the oil pressure developed therein exceeds a selected threshold, said electrical control system including, a solenoid switch having normally open contacts, said contacts being in circuit between the source and the current consuming devices and said solenoid switch further having an electrical winding for closing the contacts upon the electrical energization thereof, a thermostatic switch adapted to be mounted in the immediate vicinity of the engine to be controlled by the heat developed thereby when the engine is in its running state, said thermostatic switch being connected to said electrical winding to complete an energizing circuit thereto from the source and maintain said contacts closed when the heat developed by the engine exceeds a selected threshold, a pressure-operated switch adapted to be mounted under the operator's seat to be operated by the presence of an operator in that seat, said pressure-operated switch being connected to said winding in shunt with said thermostatic switch to complete an energizing circuit thereto from the source and maintain said contacts closed in the presence of an operator in the operator's seat, and means for connecting the first mentioned electrical switch in circuit with the source and with said electrical winding of said solenoid switch to energize said winding and maintain said contacts of said solenoid switch closed whenever the engine is running and when the oil pressure is above the predetermined threshold.

No references cited.